United States Patent [19]

Cohen

[11] Patent Number: 4,955,785
[45] Date of Patent: Sep. 11, 1990

[54] FAN STRUCTURE WITH FLOW RESPONSIVE SWITCH MECHANISM

[75] Inventor: Mordechai Cohen, San Diego, Calif.

[73] Assignee: Sundstrand Corporation, Rockford, Ill.

[21] Appl. No.: 279,869

[22] Filed: Dec. 5, 1988

[51] Int. Cl.$^5$ .............................................. F01D 21/14
[52] U.S. Cl. ........................................ 415/26; 417/43; 200/81.9 R; 73/861.76
[58] Field of Search ............... 415/26, 29, 47; 417/43; 200/81.9 R; 73/861.75, 861.76

[56] References Cited

U.S. PATENT DOCUMENTS

| | | | |
|---|---|---|---|
| 826,869 | 7/1906 | Ortmann | 415/146 |
| 1,669,581 | 5/1928 | Spencer | 415/204 |
| 1,967,018 | 7/1934 | Bohner | 340/606 |
| 2,121,651 | 6/1938 | Claytor | 200/81.9 R |
| 2,205,281 | 6/1940 | Claytor | 200/81.9 R |
| 2,226,785 | 12/1940 | Soucy | 200/81.9 R |
| 2,227,291 | 12/1940 | Wittman | 200/81.9 R |
| 2,635,160 | 4/1953 | Lewus | 200/81.9 R |
| 3,394,696 | 7/1968 | Cooper | 200/81.9 R |
| 3,423,926 | 1/1969 | Nancarrow et al. | 60/615 |
| 3,431,046 | 3/1969 | Winegardner | 200/81.9 R |
| 3,865,505 | 2/1975 | Flatland | 415/149 |
| 4,275,700 | 1/1981 | Graham | 123/590 |
| 4,479,115 | 10/1984 | Holzhauer | 340/611 |

FOREIGN PATENT DOCUMENTS

| | | | |
|---|---|---|---|
| 941220 | 4/1956 | Fed. Rep. of Germany | 415/47 |
| 1315855 | 12/1962 | France | 200/81.9 R |

Primary Examiner—John T. Kwon
Attorney, Agent, or Firm—Wood, Phillips, Mason, Recktenwald & Vansanten

[57] ABSTRACT

The problem of providing a simple, small, lightweight and reliable flow responsive switch mechanism (32) in a fan structure, such as for aerospace applications, is solved by providing a housing (12) defining a fan involute (22). An impeller (18, 20) is mounted in the housing for forcing air through the fan involute. A vane (34) is disposed directly in the fan involute, rotatably mounted on the housing, for rotation in response to air flow through the fan involute. An electrical switch (52) is mounted on the housing and is operatively associated with the vane for altering the state of the switch in response to air flow through the fan involute from the impeller.

7 Claims, 2 Drawing Sheets

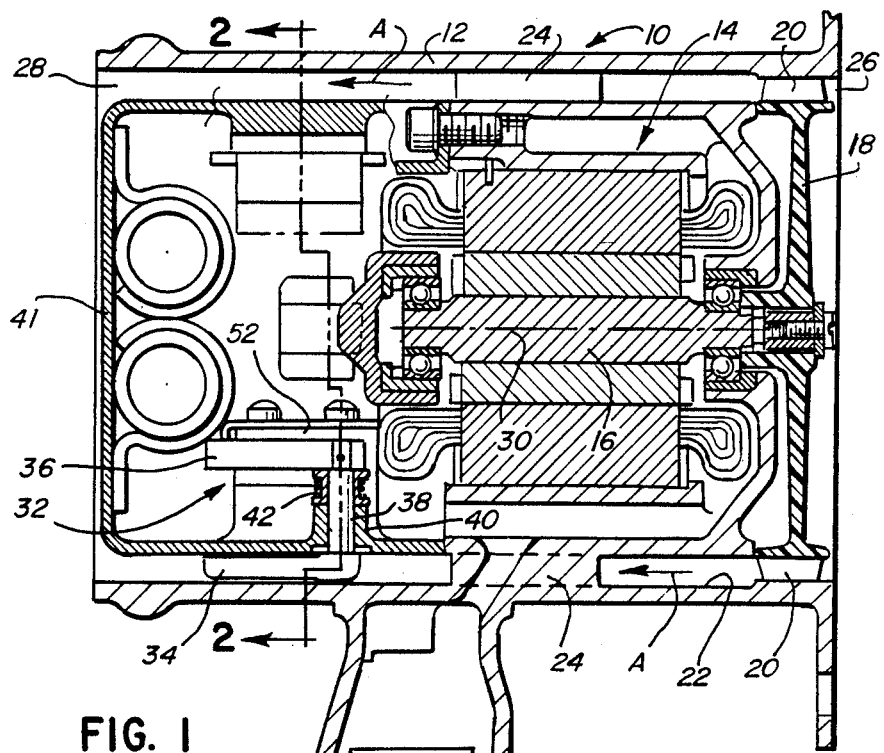
FIG. 1
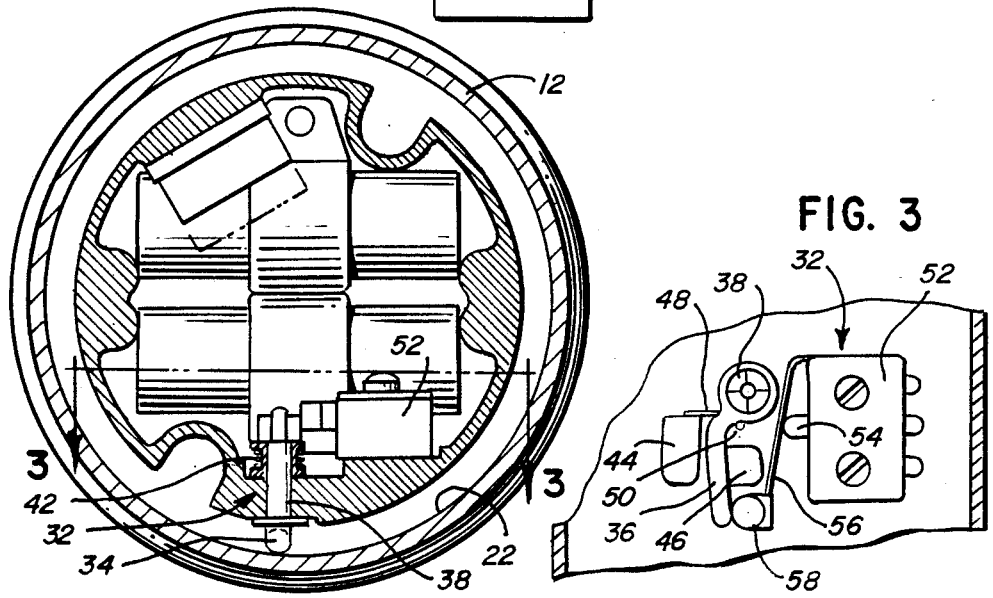
FIG. 2
FIG. 3

FAN STRUCTURE WITH FLOW RESPONSIVE SWITCH MECHANISM

FIELD OF THE INVENTION

This invention generally relates to the art of fan structure, such as cooling fans and, particularly, to a fan having a flow responsive switch mechanism.

BACKGROUND OF THE INVENTION

Fans have been used for many years for a wide variety of purposes and are designed in an equally wide variety of configurations. Various attempts have been made to control the operation of fans and/or to provide some form of failure or fault detection. Such attempts have included differential pressure switches, downstream pressure switches, motor RPM sensors, current sensors, and the like. For the most part, most such approaches are fairly complicated, add undesirable weight to the fan package or considerably add to the package or envelope size. All of these factors are undesirable and cause problems in aerospace applications where simplicity, size and weight are critical parameters.

Furthermore, in aerospace applications, reliability is of paramount importance. Differential pressure switches are difficult to predict and calibrate. Sophisticated aerospace fan structures usually are self-contained and totally enclosed packages, and downstream pressure switches sometimes do not give an accurate indication or are not responsive to the air flow in the fan air stream conduit or involute itself. RPM sensors may sense fan rotation even though the fan fails because of low or no flow in the fan involute, itself. Ease of installation and maintenance also are critical in aerospace applications where such prior approaches are unacceptable.

There is a definite need for a fan structure with a flow responsive switch mechanism which is simple, small and lightweight, easy to install and maintain and very reliable in indicating fan performance. For instance, in aerospace applications, activation of the switch can be used to provide a signal indicating the sufficiency or insufficiency of air flow through the fan, or the switch can be used in a servo-type system to respond appropriately to the presence or absence of sufficient air flow through the fan.

This invention is directed to satisfying these needs and solving the problems of prior fan controls.

SUMMARY OF THE INVENTION

An object, therefore, of the invention is to provide a new and improved fan structure with a flow responsive switch mechanism of the character described.

Generally, in the exemplary embodiment of the invention, housing means are provided and define an internal fan involute. Impeller means are mounted in the housing means for forcing air through the fan involute. A vane is disposed directly in the fan involute itself and is rotatably mounted on the housing means for rotation in response to air flow through the fan involute. Electrical switch means are mounted on the housing means, operatively associated with the vane, for altering the state of the switch means in response to air flow through the fan involute from the impeller means. The fan may be an axial fan, a circular fan or any other appropriate configuration having internal fan involutes.

More specifically, as disclosed herein, the vane is spring loaded and biased toward an inoperative position at least partially opposing the air flow. The vane has a vane portion in the air flow and a lever portion engageable with an actuator of the switch means which may be a snapaction switch. Stop means are provided on the housing engageable by the lever portion to define the inoperative position and against which the vane is spring biased. Further stop means are provided on the housing engageable by the vane (or lever portion) in its operative, switch altering position to prevent the vane from fluttering in the air flow.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is an axial section through a fan structure of the axial flow type, incorporating the flow responsive switch mechanism of the invention;

FIG. 2 is a vertical section taken generally along line 2—2 of FIG. 1;

FIG. 3 is a fragmented section taken generally along line 3—3 of FIG. 2;

DETAILED DESCRIPTION OF THE PREFERRED EMBODIMENTS

Figure 4:
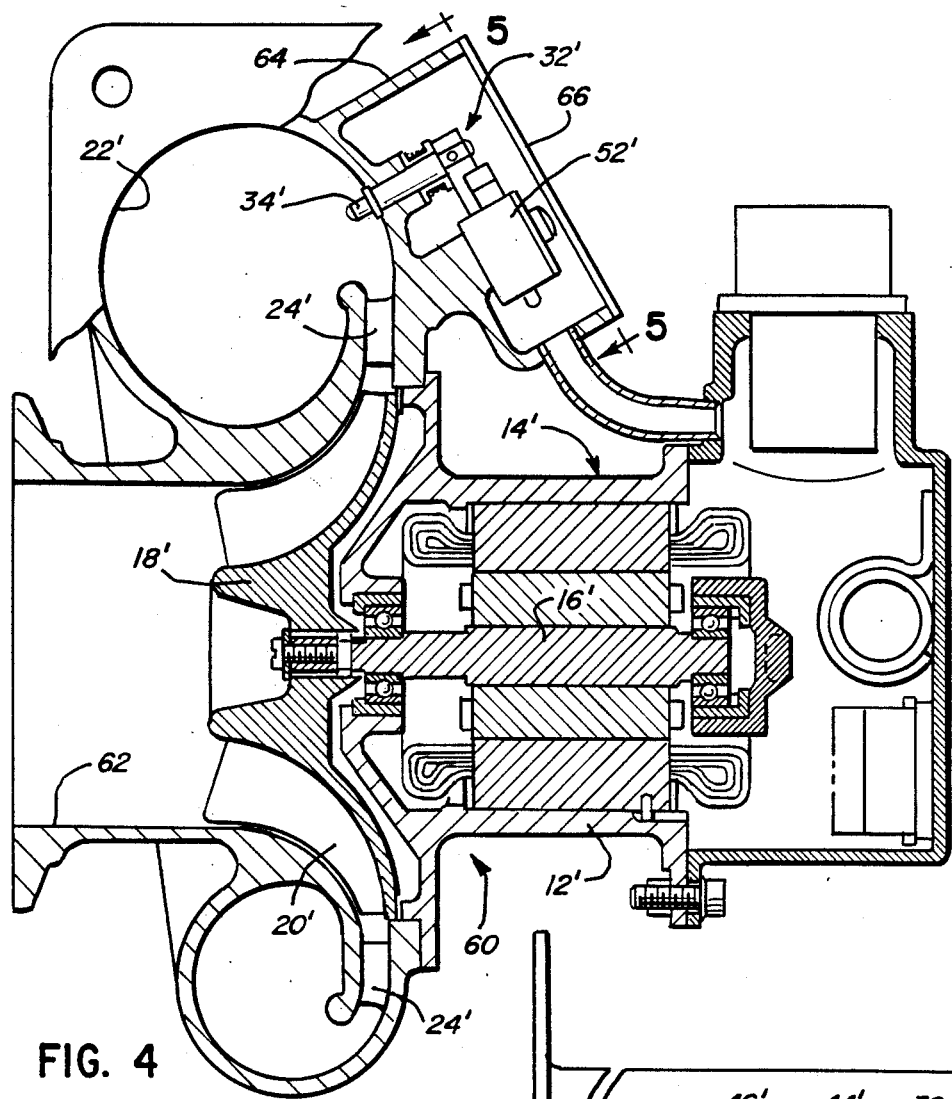
FIG. 4 is an axial section through a fan structure of the circular or centrifugal type, incorporating the flow responsive switch mechanism of the invention.
Figure 5:
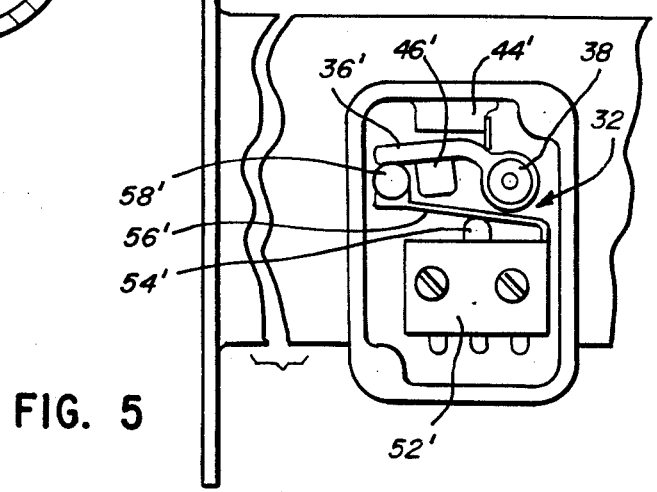
FIG. 5 is an elevational view of the switch mechanism taken generally in the direction of line 5—5 in FIG. 4, with the switch cover removed.

Referring to the drawings in greater detail, FIGS. 1-3 illustrate the flow responsive switch mechanism of the invention in combination with a fan structure of the axial flow type, and FIGS. 4-5 show the switch mechanism in combination with a fan structure of the circular or centrifugal type. Generally, the structure and function of the switch mechanism itself is substantially identical in both configurations of fan structures.

Referring first to FIGS. 1-3, an axial-type fan, generally designated 10, includes a housing 12 within which is mounted an electrical motor, generally designated 14. The motor rotates a shaft or rotor 16 for rotating an impeller 18 having impeller blades 20.

Fan housing 12 defines a cylindrical air stream conduit or involute 22 having flow straightening vanes 24 therein. The inlet end of the fan involute is at 26 and the outlet end is at 28. It can be seen that impeller blades 20 are located near the inlet end. Therefore, it can be understood that the direction of air flow through the fan involute is in the direction of arrows "A", axially of the fan, i.e. generally parallel to axis 30 of rotor 16. This type of axial fan is generally conventional and further details are deemed unnecessary.

The invention contemplates incorporating a flow responsive switch means, generally designated 32, inside housing 12 as an integral, interior component of the fan structure, such that it has a vane directly in the fan involute responsive to the air flow therethrough. More particularly, as best seen in FIG. 1, the vane includes a vane portion 34, a lever portion 36 and a shaft 38 joining the vane and lever portions. The shaft is journaled within a boss 40 inside a housing 41 so that the vane is rotatable about the axis of the shaft. Housing 41 is the rear cover. The switch is mounted to the rear cover before the rear cover is attached to the housing 12. Therefore, it is easy to mount (and solder) the switch. It can be seen that vane portion 34, within fan involute 22, is elongated in the direction of the air stream conduit defined by involute 22. Therefore, it can be understood that rotational movement of vane portion 34 about an axis of rotation defined by shaft 38, in response to air flow, will cause lever portion 36 to rotatably move correspondingly.

Referring to FIGS. 2 and 3 in conjunction with FIG. 1, an end view of vane portion 34 integral with shaft 38 can be seen in FIG. 2 in relation to the circular size of fan involute 22. It immediately can be seen that the vane portion takes up an extremely small amount of the area of the fan involute. The narrow vane portion, therefore, causes a bare minimum of air blockage and corresponding pressure drop within the air flow scheme or system.

FIG. 2, as well as FIG. 1, also shows that the vane is spring loaded by a coil spring 42 which, as will be understood hereinafter, biases the vane to an inoperative position, with vane portion 34 at least partially opposing the air flow.

Referring to FIG. 3, lever portion 36 is shown at the top (in relation to FIGS. 1 and 2) of shaft 38. A pair of stops 44 and 46 are defined within the fan housing and against which lever 34 can abut. Stop 44 defines an inoperative position of the vane and against which the vane is spring biased. One end 48 of coil spring 42 abuts stop 44 and an opposite end 50 of the coil spring seats behind lever portion 36 to bias the vane toward its inoperative position, i.e. lever portion 36 against stop 44. Stop 46 defines an operative position of the vane and against which lever portion 36 abuts in order to prevent the vane portion 34 from fluttering in the air flow.

The switch portion of the flow responsive switch mechanism includes a snap-action switch 52. The positional relationship of the switch with lever portion 36 is best seen in FIG. 3. The switch includes a switch button 54 engageable by an actuator arm 56. The actuator arm has a small bearing ball or roller 58 on the distal end thereof for engagement by lever portion 36 of the flow responsive vane. The lever portion and switch components are shown in FIG. 3 in their operative positions with lever portion 36 against stop 46 and biasing actuator arm 56 against switch button 54. This is the position effected in response to air flow, as vane portion 34 can be seen in FIGS. 1 and 2 in-line with the air flow direction.

Snap-action switch 52, itself, is a small, lightweight and hermetically sealed switch. The switch is charged with an inert gas and is completely sealed to provide constant operating characteristics. It is of a high temperature construction and is designed for use from −85° F. to 500° F., and is selected for aerospace applications.

As stated above, the flow responsive switch mechanism described above can be used to provide a signal indicating the sufficiency or insufficiency of air flow through the fan involute, or the switch can be used in a servo-type system to respond appropriately to the presence or absence of sufficient air flow through the fan involute. From the foregoing detailed description, it can be understood that the vane switch mechanism is designed to actuate and deactuate the snap-action switch in response to given air flow forces (i.e., dynamic pressures). When the fan is powered-on, air flow impinges upon vane portion 34 creating a force which rotates the vane portion in-line with the air flow, against the biasing of spring 42 and actuating switch 52. During fan operation, lever portion 36 is positively forced against stop 46 to prevent flutter. The switch state remains in its altered condition from its normal inoperative position (e.g. to provide an open circuit) when actuated. When the fan is powered-off and/or insufficient air flow is passing through fan involute 22, spring 42 biases the vane portion back into the flow stream and deactivates the switch. The vane geometry and a known spring rate can provide a predictable and repeatable function of vane angle (and deactivation point) versus flow. The switch will provide electrical continuity when deactivated.

FIGS. 4 and 5 show the flow responsive switch mechanism of the invention in combination with a fan structure, generally designated 60, of the circular or centrifugal type. Otherwise, the structure and operation of the flow responsive switch means is identical. Therefore, identical "primed" numbers will be used to reference identical components previously described in relation to FIGS. 1–3. Suffice it to say, the centrifugal fan includes a motor, generally designated 14', having a rotor 16' for rotating an impeller 18' which includes impeller blades 20'. Air is forced through an inlet 62 centrifugally past air straighteners 24' and into a circular or centrifugal fan involute 22'. Flow responsive switch mechanism 32' is mounted substantially within a housing portion 64 of a fan housing 12'. A cover 66 provides access to the flow responsive switch mechanism.

Like the axial-fan is illustrated of FIGS. 1–3, switch mechanism 32' is vane operated and includes a vane with a vane portion 34' disposed directly in centrifugal fan involute 22'. In order to avoid unnecessary duplication of the description and operation of the flow responsive switch mechanism, the depiction of the switch mechanism 32' in FIG. 4 can be compared directly to that shown in FIG. 2, and the depiction shown in FIG. 5 can be compared directly to that shown in FIG. 3. All positions of the components are identical and reference is made above for a clear description of the positional relationships and operation of the mechanism.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a fan structure, a flow responsive switch mechanism, comprising in combination:

housing means including a first part defining a motor compartment for housing a motor means with an axis and a second part connected to the first part and defining an annular fan involute outside the motor compartment;

impeller means in the housing means and coupled to the motor means for forcing air substantially axially of the motor axis through the fan involute defined by the first and second housing means parts;

a vane disposed in the fan involute and rotatably mounted on the housing means for rotation in response to air flow through the fan involute; and electrical switch means mounted on the housing means and operatively associated with the vane for altering the state of the switch means in response to air flow through the fan involute from the impeller means.

2. The combination of claim 1 wherein said vane is spring loaded and biased toward an inoperative position at least partially opposing the air flow.

3. The combination of claim 2, including stop means on the housing means defining said inoperative position and against which the vane is spring biased.

4. The combination of claim 1 wherein said electrical switch means comprise a snap-action switch including an actuator operatively associated with the vane.

5. The combination of claim 4 wherein said vane includes an integral lever portion engageable with the switch actuator.

6. The combination of claim 4, including stop means on the housing means engageable by the lever portion in the operative position of the vane.

7. The combination of claim 1, including stop means on the housing means engageable by the vane in its operative position to prevent the vane from fluttering in the air flow.

* * * * *